Aug. 16, 1966  P. L. ROMEO  3,266,875
PRODUCTION OF METAL-CARBON COMPOUNDS
Filed Oct. 25, 1962  2 Sheets-Sheet 1
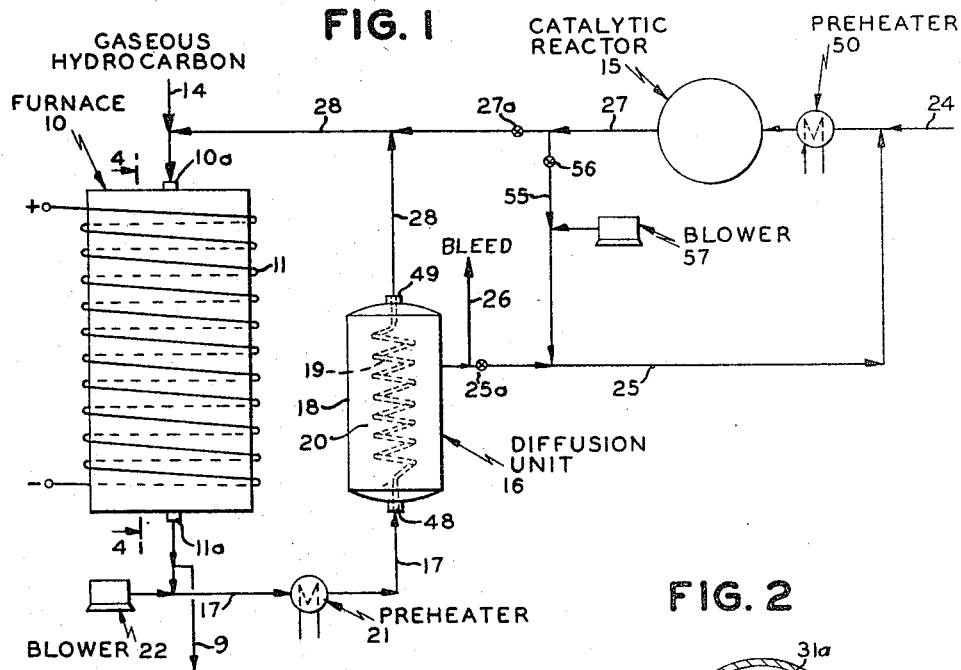
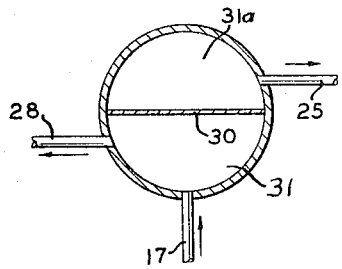
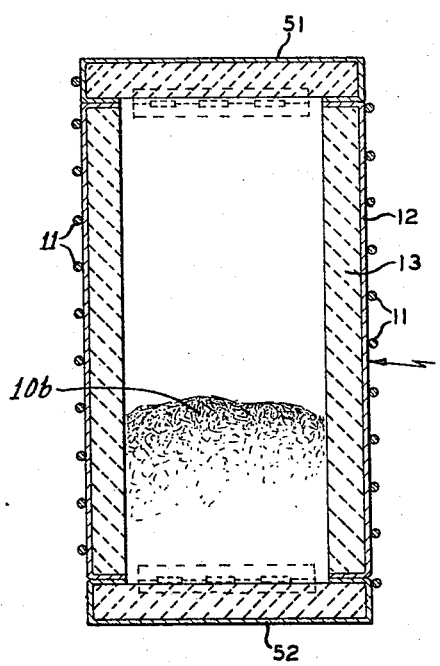
INVENTOR.
PHILIP L. ROMEO
BY
ATTORNEY

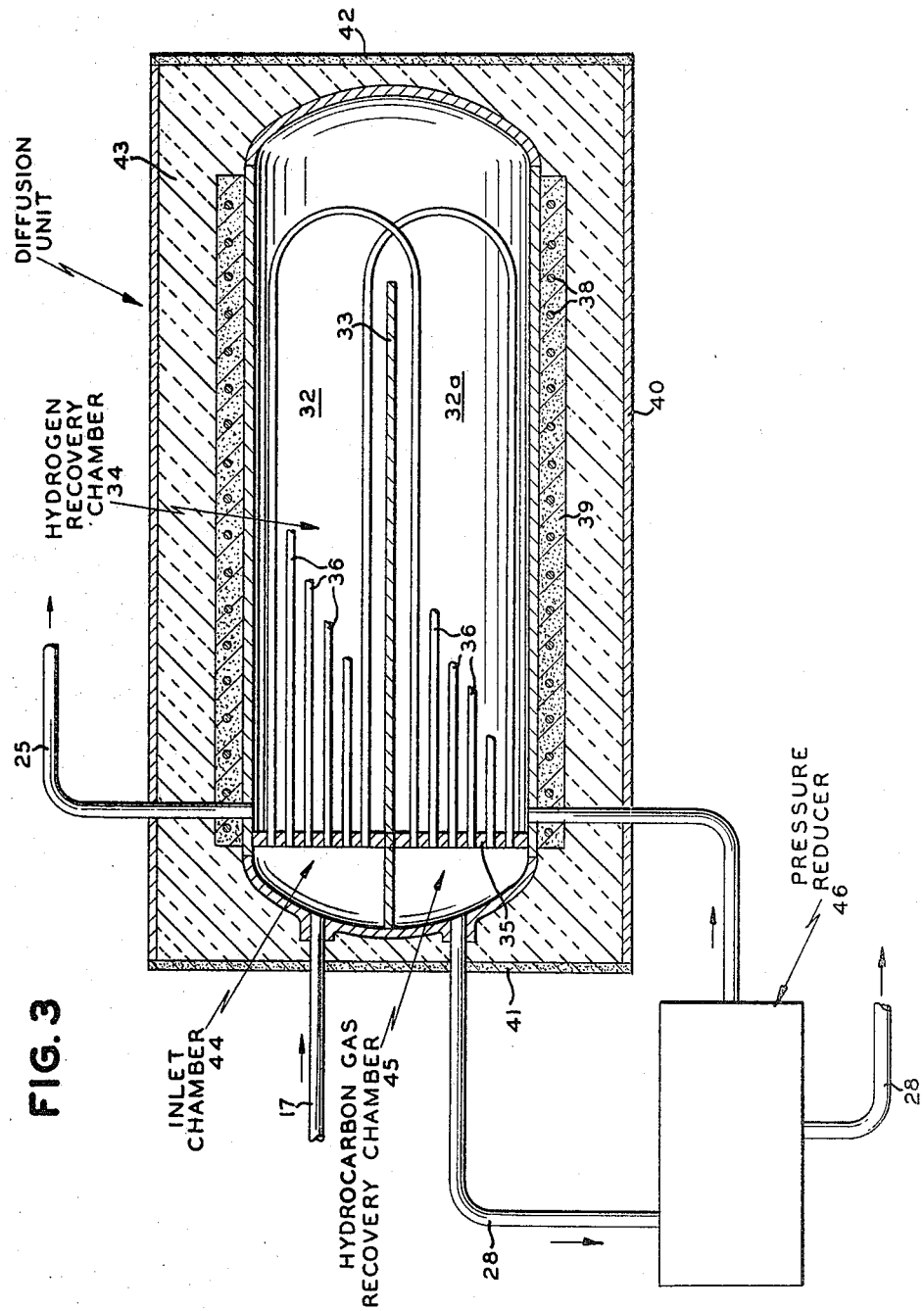

United States Patent Office 3,266,875
Patented August 16, 1966

3,266,875
PRODUCTION OF METAL-CARBON COMPOUNDS
Philip L. Romeo, Old Bridge, N.J., assignor to Engelhard Industries, Inc., Newark, N.J., a corporation of Delaware
Filed Oct. 25, 1962, Ser. No. 232,947
5 Claims. (Cl. 23—349)

This invention relates to the production of metal-carbon compounds and more specifically to a process and apparatus for the production of such compounds, for instance uranium carbides.

Uranium-carbon compounds, for instance uranium carbides such as the monocarbide are produced by adding a predetermined quantity of methane or other gaseous aliphatic hydrocarbon to a furnace containing uranium at an elevated temperature below the melting point of the uranium, and continuously recycling the effluent gas which contains unreacted methane and hydrogen to the furnace until the desired product is obtained. The problem with such production is twofold: First, there is the problem of reversal of the reaction with decomposition of the uranium carbide. Two volumes of hydrogen are formed for each initial mole of methane as shown by the equation $U+CH_4 \rightarrow UC+2H_2$, and the increased hydrogen concentration with the attendant increased pressure favor reversing the initial reaction to decompose the monocarbide with production of methane and uranium. Secondly, the commercial methane or natural gas usually employed for the reaction usually contains as impurities varying quantities of carbon dioxide and paraffinic hydrocarbons, e.g. ethane, propane and butane, and at times nitrogen and sulfur containing compounds, e.g. hydrogen sulfide, and these impurities react in varying degrees with the uranium to reduce the yield of the desired uranium carbide. Accordingly it would be desirable to convert all the impurities to methane prior to contact with the uranium to obtain a higher yield of the uranium-carbon compound.

In accordance with the claimed invention, a process is provided for the production of metal-carbon compounds, for instance metal carbides, e.g. uranium monocarbide (UC) or dicarbide ($UC_2$), which overcomes the difficulties previously mentioned due to the increased partial pressures of hydrogen in the effluent gas as well as the impurities in the commercial methane or natural gas. The process involves heating the metal, for instance the uranium when the uranium-carbon compounds are desired, in contact with a normally gaseous hydrocarbon, for instance methane, in amount and at a temperature according to whether uranium monocarbide or the dicarbide is desired in a reaction zone to form the uranium carbide and also gaseous by-products including hydrogen and unreacted methane. The hydrogen of the gaseous by-products is then separated from the unreacted methane and other constituents thereof, preferably by diffusion through a barrier of a material which permits the diffusion of hydrogen therethrough to the exclusion of the other constituents. Preferred among such materials are palladium and palladium-containing alloys. The free or substantially hydrogen-free gaseous by-products are then returned to the reaction zone for further reaction of the methane with the metal to produce the desired metal-carbon compound.

The process of the present invention is also applicable to the formation of carbon compounds such as carbides of metals other than uranium. Exemplary of these other metals are those of Groups VB and VIB of the Periodic Table, which are vanadium, niobium, tantalum, chromium, molybdenum and tungsten.

The uranium metal is heated in contact with the normally gaseous aliphatic hydrocarbon at an elevated temperature sufficiently high for the reaction but less than the melting point of the uranium when the uranium monocarbide is the product desired. Reaction temperatures of about 750° C.–1100° C. are preferred for the production. When the uranium dicarbide is desired the uranium metal is heated in contact with the normally gaseous aliphatic hydrocarbon at an elevated temperature higher than the melting point of the uranium, preferably at temperatures of about 1150° C.–2100° C. The normally gaseous aliphatic hydrocarbon is supplied for the reaction in approximately stoichiometric amount for reaction with the uranium to produce uranium monocarbide when this is the desired product and in approximately stoichiometric amount for reaction with the uranium to produce uranium dicarbide when such is the product desired.

When the carbide of the metals other than uranium is desired, the normally gaseous aliphatic hydrocarbon is passed over a mass of the heated metal, for example the vanadium, niobium, tantalum, chromium, molybdenum or tungsten, which is at a temperature approximating that for the reaction of the uranium to form the dicarbide. The result is formation of the carbide of the metal.

The gaseous by-product effluent, prior to introduction into the selective diffusion zone for separation of the hydrogen, is preheated, if necessary, to maintain its temperature elevated and preferably above 250° C., more preferably from about 425° C.–600° C., to achieve good selective diffusion of the hydrogen through the diffusion barrier.

In a preferred embodiment, a portion of the hydrogen separated from the by-product gaseous effluent is admixed with newly incoming normally gaseous hydrocarbon, for instance commercial methane or natural gas, containing as impurities carbon dioxide and paraffinic hydrocarbons, e.g. ethane, propane and butane, and at times nitrogen and sulfur-containing compounds, e.g. hydrogen sulfide. The resulting gaseous admixture is then passed into contact with a platinum group metal catalyst, preferably rhodium, ruthenium, palladium or platinum, at elevated temperatures of preferably from about 100° C.–500° C., more preferably from about 200° C.–400° C. to convert the carbon dioxide and paraffinic hydrocarbon impurities by methanation and hydrocracking respectively to methane. The high purity methane is then passed into the reaction zone for reaction with the metal, being passed directly therein or being added to the hydrogen-free gas from the hydrogen separation zone and the resulting admixture introduced into the reaction zone.

Reference is now made to the accompanying drawings wherein:

FIGURE 1 is an elevation view partly in section of apparatus of this invention;

FIGURE 2 is a section through another diffusion unit that can be used in the present invention;

FIGURE 3 is a detail sectional elevational view of another diffusion unit that can be empolyed in the present invention; and FIGURE 4 is a section taken on line 4—4 of FIGURE 1.

Referring now to the embodiment of FIGURE 1, the reaction chamber or furnace 10 is adapted to contain a mass of high purity metal, for instance uranium metal of typically 98% or higher uranium content. Particulate uranium metal is preferably utilized for production of the uranium monocarbide but non-particulate uranium can also be utilized if a uranium carbide coating is desired on the uranium mass. The particulate uranium metal has typical particle size of about ⅛". For heating uranium to manufacture uranium monocarbide at 750° C.–1100° C., coil 11 of Nichrome resistance wire is provided about furnace 10 to supply the necessary heat to the uranium in the furnace for its reaction with the carbon of the normally gaseous aliphatic hydrocarbon. For production of uranium dicarbide at 1150° C.–2100° C., resistors of silicon carbide or other material suitable for the higher temperatures are used instead of the Nichrome of coil 11. As shown in more detail in FIGURE 4, furnace 10 comprises a metallic shell 12 of ferrous metal having inner lining 13 of refractory material. Referring again to FIGURE 1, if the gaseous hydrocarbon is of high purity, for instance methane of 99.9 percent purity, it is supplied to inlet 10a of furnace 10 through conduit 14. However, if the hydrocarbon gas is a commercial hydrocarbon gas such as commercial methane or natural gas, the gas is preferably first purified by passage over a platinum group metal catalyst in catalytic converter 15 hereafter discussed. Diffusion unit 16, which is connected to the outlet 11a of furnace 10 through conduit 17, comprises casing 18 and tubular coil 19 of preferably palladium or a palladium alloy, for instance a palladium-silver alloy containing 25 weight percent silver. Coil 19 has inlet 48 for incoming gaseous by-products. Other less preferred materials that can be utilized instead of the palladium or palladium alloy for coil 19 include nickel or high-carbon steel. The by-product effluent gases from furnace 10, which contain unreacted methane plus the hydrogen, pass from furnace 10 through its outlet 11a and discharge conduit 17 and into and through tubular coil 19. Purge conduit 9 equipped with a manually operated valve (not shown) is provided for removing a minor portion, typically 5–10 volume percent, of the effluent gases from the main stream of effluent gas to prevent build-up of impurities other than hydrogen in the system. In tubular coil 19, the hydrogen is separated from the unreacted methane by selective diffusion through the lattice of the material of the coil wall. The thus-separated hydrogen is accumulated in recovery chamber 20 surrounding the coil 19.

Although the palladium or palladium alloys or other materials disclosed herein of the diffusion barrier are non-porous in character, these materials have a lattice arrangement such that the hydrogen will diffuse therethrough to the exclusion or substantial exclusion of the methane and other constituents that may be present in the by-product effluent gases.

A pressure booster 22 in communication with conduit 17, which can be a blower or compressor, is provided for supplying the necessary pressure for movement of the effluent gases. It may be unnecessary to use this pressure booster if the by-product effluent gases passing from furnace 10 are sufficiently pressurized to result in good diffusion separation of the hydrogen. Supra-atmospheric pressures of the by-product effluent gases are preferred for the diffusion separation. For instance, in using a diffusion barrier of wall thickness of 4 mils, pressures of the by-product effluent gases of 460 p.s.i.g. on one side of the barrier and 10 p.s.i.g. on the opposite side of the barrier gives good diffusion separation of the hydrogen. Preheater 21 connected in conduit 17 effects heating the effluent gases sufficiently, preferably to temperatures in excess of 250° C., more preferably from about 425° C.–600° C. to obtain efficient selective diffusion of the hydrogen through the palladium barrier of diffusion unit 16. However, this preheater is also not necessary if the by-product effluent gases are at a sufficiently elevated temperature when issuing from the furnace 10.

Catalytic converter or reactor 15 is a metallic vessel, for instance of ferrous metal, provided with a platinum group metal catalyst, preferably rhodium, ruthenium, palladium, or platinum. The catalytic metal thereof is preferably supported on a solid carrier, e.g. silica, alumina, carbon, kieselguhr, asbestos, etc., which can be in the form of pellets, granules, spheres, fibers or other shapes. This catalyst can be prepared by treating the carrier with a solution of a compound of the catalytic metal, followed by heating the treated carrier to deposit active metal.

Newly-incoming impure gaseous hydrocarbon, for instance commercial methane containing as typical impurities, carbon dioxide and normally gaseous paraffinic hydrocarbons, e.g. ethane, propane and butane, and sometimes nitrogen and sulfur compounds, e.g. hydrogen sulfide is supplied to catalytic reactor 15 through conduit 24. Preheater 50 is connected in line 24 for raising the temperature of the gaseous mixture to the desired elevated temperature hereafter specified for contacting the catalyst in reactor 15. Diffusion unit 16 is connected to supply conduit 24 by valved conduit 25 provided with valve 25a. Bleed conduit 26 equipped with a pressure regulator valve (not shown) communicates conduit 25 with the atmosphere for removing a major portion of the hydrogen from the system, but still retaining a sufficient amount of the hydrogen to convert all or substantially all of the carbon dioxide and paraffinic hydrocarbon impurities to methane. The pressure regulator valve is set at a predetermined pressure, for instance 10 p.s.i.g., and the hydrogen gas from diffusion unit 16 at pressure above this predetermined pressure passes through the pressure regulator and conduit 26 and is vented and flared. Conduit 25 supplies the hydrogen from the recovery chamber of the diffusion unit, after removal of a portion of the gas through bleed conduit 26, to the supply conduit 24 for admixture with the impure gaseous hydrocarbon for the catalytic conversion of the impurities to methane. Temperatures of preferably from about 100° C.–500° C., more preferably from about 200° C.–400° C., and pressures of preferably about 1–250 atmospheres, more preferably from about 5–200 atmospheres can be employed for such catalytic conversion. The purified product high purity methane, for instance methane of 99.9% or higher concentration when commercial methane is the incoming hydrocarbon feed gas, is withdrawn from the catalytic converter through conduit 27 equipped with valve 27a and admixed with the concentrated methane or other hydrocarbon gas issuing from the outlet 49 of tubular coil 19 of the diffusion unit and passing through conduit 28. By-pass conduit 55 provided with valve 56 connects conduits 27 and 25 and is utilized for recycling the gas exiting from converter 15 back through this converter, if desired, for obtaining a still higher concentration of methane. Blower 57 communicates with by-pass conduit 55 for providing for the movement of the gas. The mixture of purified hydrocarbon from catalytic converter 15 and diffusion unit 16 is then passed via conduit 28 into conduit 14 for passage to the inlet 10a of furnace 10 for reaction with the uranium metal therein.

In FIGURE 2 is shown a modification of the diffusion unit of this invention. The diffusion barrier in this modification is in the form of a sheet or membrane 30 of palladium or palladium alloy or one of the other barrier materials previously disclosed, and not a tube. In this embodiment, the by-product effluent gases are introduced into the inlet chamber 31 of the unit with the hydrogen selectively diffusing through the lattice of the non-porous material of sheet 30 and being withdrawn from recovery chamber 31a through line 25, and the retained gas of higher hydrocarbon concentration being withdrawn through line 28.

In still another embodiment of the diffusion unit shown in FIGURE 3, the diffusion unit, which is cylindrical in shape and made of ferrous metal, is divided into two semi-cylindrical portions 32 and 32a by the stainless steel plate 33, which extends across hydrogas recovery chamber 34 for most of its length. With the plate 33 in place, the recovery chamber 34 assumes a U-shaped configuration with one of the legs of the U being above the plate 33 and the other leg being below the plate 33. Apertured stainless steel end plate 35 includes upper and lower semi-cylindrical plates which close off one end of the recovery chamber 34. A series of U-shaped diffusion tubes 36 of palladium, palladium alloy, or one of the materials previously mentioned are mounted in the recovery chamber with one leg of each tube being secured in the end plate 35 above the dividing plate 33, and the other leg secured therein below the plate 33. Two of these U-shaped diffusion tubes 36 are shown complete in FIGURE 3, and the remaining of these tubes 36, which are shown broken away, have similar configuration as the two tubes shown complete. Surrounding the recovery chamber 34 is heating coil 38 of resistance wire, for instance Nichrome wire. This heating coil is encased in a layer of cement 39, for instance asbestos cement. As shown, the entire unit is mounted in an aluminum container 40 having end walls 41 and 42 of asbestos cement or the like. The remainder of the space within the container 40 may be filled with a suitable thermal insulation material 43, for instance magnesium oxide. The by-product effluent gas containing the hydrocarbon and hydrogen passing from furnace 10 is supplied to inlet chamber 44 of the unit through conduit 17, and the concentrated hydrocarbon gas free or substantially free of hydrogen is received in recovery chamber 45, being withdrawn therefrom through conduit 28. The concentrated hydrocarbon gas is passed to pressure reducer 46, and a portion of this gas is returned to portion 32a of the recovery chamber to provide a countercurrent flow across the surfaces of the diffusion tubes 36 which is effective to reduce the total pressure drop required across the tubes 36. This makes for a practical commercial system with relatively high flow rates. The separated hydrogen gas, which has diffused through the lattice arrangement of the palladium or palladium alloy walls of tubes 36 to the exclusion of the other constituents of the by-product effluent gas, is withdrawn from the unit through conduit 25. This embodiment of the diffusion unit is disclosed in co-pending U.S. patent application Serial No. 35,299, of Pfefferle et al., filed June 10, 1960, now abandoned.

Another diffusion unit which can be employed in the present invention is that disclosed in co-pending U.S. patent application Serial No. 19,393, of Pfefferle, filed April 1, 1960, now Patent No. 3,144,313, which includes first and second diffusion units each including inlet and recovery chambers separated by a palladium or palladium alloy diffusion membrane, with means for passing the gas including as a constituent the gas to be recovered through the inlet chamber at a predetermined direction with respect the membrane, and means for passing the gas through the recovery chamber in an opposite direction with respect the membrane. This use of countercurrent flow in the input and recovery chambers is very helpful in maintaining an appreciable difference in partial pressures along the length of the membrane and without excessive total pressure drop across the membrane, which facilitates the separation.

In operation, the incoming high-purity normally gaseous aliphatic hydrocarbon, for instance methane is introduced into reaction chamber or furnace 10, shown in FIGURE 1, through supply conduit 14 wherein it contacts the mass of heated uranium metal 10b (shown in FIGURE 4) therein. The heated uranium metal is at an elevated temperature previously disclosed with the particular temperature employed depending on the particular uranium-carbon compound desired. The uranium of the gaseous hydrocarbon and carbon react in furnace 10 in accordance with the equation:

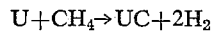

when uranium monocarbide is desired; and in accordance with the equation:

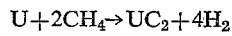

when uranium dicarbide is desired. Other normally gaseous aliphatic hydrocarbons that can be utilized herein besides methane are, for example propane and ethane.

In order to obtain the desired conversion of uranium metal to the particular uranium-carbon compound desired in furnace 10, it is necessary that the by-product effluent gas containing unreacted methane or other hydrocarbon from the reactor be recycled through the furnace a number of times, typically 3–4 times, in order to increase the yield of uranium carbide and to remove undesirable reaction products, for instance hydrogen from the surface of the reaction mass. However, due to the production of two moles of hydrogen for each mole of uranium carbide in the furnace 10 when the monocarbide is produced, and four moles of hydrogen for each mol of uranium dicarbide when the dicarbide is produced, the partial pressure of the hydrogen in this effluent gas issuing from reactor 10 is very high and, if this hydrogen partial pressure is not removed or materially reduced, it will drive the reactions set forth in the equations above-specified to the left with decomposition of the particular uranium-carbon compound to again produce uranium metal and hydrocarbon. Consequently, to overcome this driving the reaction to the left, the by-product effluent gases containing hydrogen and unreacted hydrocarbon are continuously withdrawn through line 17, a minor portion of the effluent gases, typically about 5–10 volume percent, is removed through conduit 9, and the remaining gases preheated if necessary by preheater 21 to temperature previously discussed. The gases are then continuously passed into diffusion unit 16 wherein the hydrogen is continuously separated from the remaining constituents of the gaseous effluent by selective diffusion through the lattice of the non-porous wall of tubular coil 19, this wall being one of the materials previously discussed. If the diffusion unit of FIGURE 2 is employed instead of the diffusion unit of FIGURE 1, then the hydrogen is continuously separated from the remaining gases by selective diffusion through the sheet or membrane 30 of one of the materials previously disclosed and withdrawn through line 25. Or, if the diffusion unit of FIGURE 3 is utilized instead of the diffusion unit of FIGURE 1, the hydrogen is continuously separated from the other gaseous constituents by selective diffusion through the walls of U tubes 36, these tube walls also being of one of the materials hereinbefore disclosed. The separated pure or substantially pure hydrogen is withdrawn from the diffusion unit in this embodiment through conduit 25 and a major portion of the hydrogen is removed from the main stream through bleed conduit 26 by proper adjustment of the pressure regulator valve (not shown) of conduit 26, leaving in conduit 25 a sufficient amount of hydrogen or small excess thereof to stoichiometrically react with the carbon dioxide and normally gaseous paraffinic hydrocarbon impurities in the commercial methane or natural gas to form additional methane, by respectively methanation of the carbon dioxide and hydrocracking of the paraffinic hydrocarbons. The exact amount of hydrogen that is bled off the hydrogen passing from the diffusion unit will depend on the amounts of carbon dioxide and paraffinic hydrocarbon present in the incoming commercial methane or nautral gas. For instance, if 5 mole percent of impurities such as carbon dioxide plus ethane are present in the commercial methane, a sufficient amount of the hydrogen from the diffusion unit is bled off through conduit 26 so that the remaining hydrogen in conduit 25 will form a mixture of 5–20 mole percent hydrogen with the commercial methane. The remaining hydrogen is passed through valve 25a and conduit 25 into admixture with the newly-incoming commercial methane of natural gas in conduit 24.

Returnning again to FIGURE 1, the gaseous stream of increased methane concentration and free or substantially free of hydrogen is then passed via line 28 to conduit 14 for introduction into the furnace 10 for reaction with the uranium. If high purity methane or other gaseous hydrocarbon is used ab initio, for instance methane of 99.9 percent methane concentration, the methane is introduced initially and throughout the production through line 14. However, if commercial methane or natural gas containing the impurities previously disclosed is utilized, the pure or substantially pure hydrogen separated by diffusion unit 16 is then withdrawn from recovery chamber 20 and a portion of the hydrogen passed through conduit 25 and added to this newly-incoming commercial methane or natural gas being supplied through conduit 24. The resulting mixture is passed through conduit 24 to catalytic reactor 15 wherein it is passed into contact with the platinum group metal catalyst previously disclosed and under the reaction conditions previously disclosed herein, whereby the carbon dioxide is converted to methane by methanation and the paraffins are hydrocracked to form methane. The gaseous stream of increased methane content is withdrawn from reactor 15 through line 27, and added to the gaseous effluent of increased hydrocarbon content exiting from tube coil 19 of diffusion unit 16 and passing through line 28. If deemed necessary or desirable, the gaseous stream from reactor 15 is recycled through converter or reactor 15 a number of times, typically 2–3 times by closing valve 27a in conduit 27 and opening valve 56 in by-pass conduit 55 and operating blower 57. After this recyling is completed valve 27a is reopened and valve 56 closed so that the gas of increased methane content from reactor 15 is passed through conduit 27 to conduit 28. The resulting gaseous mixture is then passed via lines 28 and 14 into furnace 10 for reaction with the uranium as previously discussed. The product uranium carbide, for instance the monocarbide or dicarbide, can be removed from reaction chamber or furnace 10 by first removal of end closure members 51 or 52 shown in FIGURE 4 of furnace 10, which closure members 51 and 52 are hinged to furnace 10 or removably mounted at the ends of furnace 10 by other suitable means known to the art, and then removing the product carbide by, for instance, a shovel.

The following example further illustrates the invention:

The apparatus of FIGURE 1 of the drawings is used. Approximately 360 cu. ft. of commercial methane is introduced into catalytic reactor 15 through conduit 24. Valve 27a is closed and blower 57 is started. The methane is then continuously recycled through catalytic reactor 15. Hydrogen is added to the commercial methane prior to reactor 15, the hydrogen passing from hydrogen recovery chamber 20. The temperature of the gas passing into the catalytic converter is 300–400° C. When the residual hydrogen reaches an equilibrium concentration of 0.1%, further hydrogen addition is unnecessary. $H_2$ is determined by Orsat analysis. Assuming 98% $CH_4$ in the commercial methane feed, two recycles are sufficient.

Valve 27a is then opened and valve 56 is closed. 359 cu. ft. of methane is allowed to enter conduit 28 en route to reactor 10. Prior to the introduction of the $CH_4$ into the carbide furnace or reactor 10, 238 lbs. of uranium metal are placed in the furnace 10. After the methane is introduced into reactor 10 the temperature of the uranium mass is gradually raised to 900–1000° C. The uranium is present as 6/8 mesh granules. As the methane is passed over the uranium in reactor 10 and then recycled through this reactor via line 17, diffusion unit 16 and line 28, approximately 50% of the methane is converted to uranium carbide and hydrogen per mass. The pressure in the system is increased by 50% due to the formation of two moles of hydrogen per mole of methane consumed.

At this high pressure, hydrogen enriched gas passes through the palladium diffusion apparatus 16. 90% of the hydrogen is stripped from the stream due to diffusion through the four mil wall palladium tubing which is at a temperature of 45° C.

The methane is continuously recycled until it is consumed almost stoichiometrically. Six recycles are sufficient for 98% methane utilization. 250 lbs. of uranium monocarbide is produced. The doors of furnace 10 are then opened, the reaction mass is allowed to cool and the uranium monocarbide removed from the furnace.

The hydrogen produced as a result of the reaction is stored in recovery chamber 20 of diffusion unit 16, and is used in succeeding runs.

It will be obvious to those skilled in the art that many modifications may be made within the scope of the present invention without departing from the spirit thereof, and the invention includes all such modifications.

What is claimed is:

1. A process for the production of a metal carbide comprising:
   (a) mixing incoming hydrocarbon gas containing impurities with hydrogen obtained from hereafter recited step (i),
   (b) passing the hydrogen-hydrocarbon gas mixture into a first reaction zone into contact with a platinum group metal catalyst at reaction temperature,
   (c) withdrawing purified hydrocarbon gas from the said first reaction zone,
   (d) passing the purified hydrocarbon gas into contact with a metal from the group consisting of uranium and metals of Groups VB and VIB of the Periodic Table in a second reaction zone at a temperature of at least about 750° C. to form the metal carbide and gaseous by-products including hydrogen and unreacted hydrocarbon gas,
   (e) withdrawing the gaseous by-products from the second reaction zone,
   (f) separating substantially pure hydrogen from the other constituents of the withdrawn gaseous by-products by selective diffusion of the hydrogen through the lattice of a substantially non-porous barrier of a material through which hydrogen diffuses to the exclusion of the other gaseous constituents thereof,
   (g) withdrawing the said substantially pure hydrogen from a diffusion side of said barrier,
   (h) bleeding off a major portion of the withdrawn hydrogen,
   (i) passing the remaining hydrogen from the diffusion side of said barrier into admixture with the hydrocarbon gas recited in step (a).

2. A process in accordance with claim 1, wherein the hydrocarbon gas withdrawn from the said first reaction zone is recycled therethrough a number of times.

3. A process in accordance with claim 1, wherein the hydrocarbon gas is methane.

4. A process in accordance with claim 1 wherein the material of the barrier is selected from the group consisting of palladium and palladium-containing alloys.

5. A process in accordance with claim 1 wherein the gaseous by-products are preheated to a temperature in excess of 250° C. prior to the diffusion separation of the hydrogen.

References Cited by the Examiner
UNITED STATES PATENTS

| | | | |
|---|---|---|---|
| 2,238,516 | 4/1941 | Chatterton | 23—262 |
| 2,580,349 | 12/1951 | Fisher | 23—14.5 |
| 2,773,561 | 12/1956 | Hunter | 55—16 |
| 2,917,371 | 12/1959 | Fisher et al. | 23—262 |
| 3,046,090 | 7/1962 | Powers | 23—14.5 |
| 3,148,031 | 9/1964 | Vahldieck et al. | 55—16 |

FOREIGN PATENTS 646,433   8/1962   Canada.

OTHER REFERENCES

AEC Document, NYO–2694, Nov. 30, 1961, pp. 5–18.

L. DEWAYNE RUTLEDGE, *Primary Examiner.*

CARL D. QUARFORTH, *Examiner.*

J. D. VOIGHT, A. G. BOWEN, L. A. SEBASTIAN,
*Assistant Examiners.*